United States Patent
Hecht

(10) Patent No.: US 11,233,805 B2
(45) Date of Patent: Jan. 25, 2022

(54) CENTRALIZED SECURITY ASSESSMENTS OF SCRIPTS IN NETWORK ENVIRONMENTS

(71) Applicant: CyberArk Software Ltd., Petach-Tikva (IL)

(72) Inventor: Asaf Hecht, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/774,277

(22) Filed: Jan. 28, 2020

(65) Prior Publication Data

US 2021/0234875 A1    Jul. 29, 2021

(51) Int. Cl.
| | |
|---|---|
| *G06F 21/56* | (2013.01) |
| *H04L 29/06* | (2006.01) |
| *H04L 12/24* | (2006.01) |

(52) U.S. Cl.
CPC ........ *H04L 63/1416* (2013.01); *G06F 21/563* (2013.01); *G06F 21/564* (2013.01);
(Continued)

(58) Field of Classification Search
CPC ................. H04L 63/1416; H04L 41/22; H04L 63/123; H04L 63/1425; H04L 63/1433; H04L 63/1466; G06F 21/563; G06F 21/564
See application file for complete search history.

(56) References Cited

U.S. PATENT DOCUMENTS

| | | | |
|---|---|---|---|
| 8,931,084 B1 * | 1/2015 | Paya | G06F 21/121 726/21 |
| 9,501,643 B1 * | 11/2016 | Zakorzhevsky | G06F 21/125 |

(Continued)

FOREIGN PATENT DOCUMENTS

| | | |
|---|---|---|
| EP | 2975534 A1 | 1/2016 |
| WO | WO 20151026971 A2 | 2/2015 |

OTHER PUBLICATIONS

Communication and Search Report, issued from the European Patent Office in corresponding Application No. 20159761.4-1218/3660714, dated Aug. 18, 2020 (8 pages).

(Continued)

*Primary Examiner* — Trang T Doan
(74) *Attorney, Agent, or Firm* — Finnegan, Henderson, Farabow, Garrett & Dunner LLP

(57) ABSTRACT

Disclosed embodiments relate to systems and methods for centrally analyzing and managing scripts. Techniques include identifying, at a centralized script execution resource in a network environment, a first script; identifying, at the centralized script execution resource, a security risk indication for the first script; determining, at the centralized script execution resource, a security context for the first script; and performing, based on the security risk indication and the security context, at least one of: determining whether to execute the first script at the centralized script execution resource on behalf of the at least one of the endpoint resources, executing the first script at the centralized script execution resource on behalf of the at least one of the endpoint resources, or determining execution conditions for execution of the first script at the centralized script execution resource on behalf of the at least one of the endpoint resources.

19 Claims, 13 Drawing Sheets

(52) U.S. Cl.
CPC ............ *H04L 41/22* (2013.01); *H04L 63/123* (2013.01); *H04L 63/1425* (2013.01); *H04L 63/1433* (2013.01); *H04L 63/1466* (2013.01)

(56) References Cited

U.S. PATENT DOCUMENTS

| | | | |
|---|---|---|---|
| 10,230,749 B1 | 3/2019 | Rostami-Hesarsorkh et al. | |
| 10,579,796 B1* | 3/2020 | Neel | G06F 21/563 |
| 10,599,635 B1* | 3/2020 | Gunn | G06F 16/258 |
| 10,599,834 B1* | 3/2020 | Stoletny | G06Q 30/0277 |
| 10,678,917 B1* | 6/2020 | Witten | G06F 21/554 |
| 2007/0028303 A1 | 2/2007 | Brennan | |
| 2011/0219448 A1 | 9/2011 | Sreedharan et al. | |
| 2014/0033276 A1* | 1/2014 | Wibbeler | G06F 21/51 726/4 |
| 2015/0331789 A1* | 11/2015 | Ekambaram | G06F 11/3664 717/124 |
| 2016/0180086 A1 | 6/2016 | Ladikov et al. | |
| 2017/0322929 A1* | 11/2017 | Hussain | G06F 9/45558 |
| 2017/0353496 A1 | 12/2017 | Pai et al. | |
| 2018/0048647 A1* | 2/2018 | Favila | H04L 63/0876 |
| 2018/0373876 A1* | 12/2018 | El-Moussa | G06F 21/566 |
| 2019/0079750 A1* | 3/2019 | Foskett | G06F 8/71 |
| 2019/0180028 A1* | 6/2019 | Seo | G06F 21/629 |
| 2020/0014713 A1* | 1/2020 | Paul | H04L 41/20 |
| 2021/0232680 A1 | 7/2021 | Hecht | |

OTHER PUBLICATIONS

Threat Analysis Report Save Yourself Malware, Virus Bulletin, Oct. 2019.

Bayer et al., Dynamic analysis of malicious code, Springer-Velag 2006.

Sikorski et al.. Practical Malware Analysis: A Hands-On Guide to Dissecting Malicious Software, No Starch Press, 2012, pp. 179-204.

* cited by examiner

200

| Accounts | Search for accounts | | Add account |
|---|---|---|---|

≈ Views | Recent | Saved

My accounts      Status
All accounts (default)      Disabled by CPM
Recently used      Failed      201
Favorites      New added
Checked-out    202      Deleted

Run Script

1 results for: All accounts      ? Additional details & actions in classic interface

| ☆ | Username | Address | Platform ID | Safe ↑ | Manual Change Reason | Keywords | Status | Access Request |
|---|---|---|---|---|---|---|---|---|
| ☆ | s_doej | il.cyber-ark.com | ILWinDomainDaily | R&D-IlPersonal-DoeJ | | | - | - |

CENTRALIZED SECURITY ASSESSMENTS OF SCRIPTS IN NETWORK ENVIRONMENTS

BACKGROUND

In modern computing environments, scripts such as code segments, API calls, discrete software commands, and complete applications are ubiquitous. Scripts like these serve many roles and arise in various contexts, such as IT maintenance, security checks, system audits, backup storage, DevOps processes, software updates, business reporting tools, and many more. While scripts are increasingly used for discrete computing tasks, it is often difficult to monitor and track the scripts once they are released. Once scripts are released, they may end up being incorporated into one or thousands of different computing resources (e.g., virtual machines, container instances, serverless code environments, physical on-premises computers, IoT devices, etc.). Further, scripts often execute automatically and quickly, through automated processes or workflows.

The proliferation of scripts in computing environments gives rise to security vulnerabilities. In many situations, the scripts are not developed by the same organizations that end up executing or storing them. For example, a script may originate from GitHub™, or another website, or perhaps even a combination of sources. There are therefore risks that scripts coming from unknown or untrusted sources may potentially include malware, errors, or other security flaws. Further, many scripts in modern environments either use credentials (e.g., fetched from a credentials repository) or contain credentials (e.g., hardcoded into the script itself). This compounds the potential damage that a script can cause in an environment. Not only can a script with a credential execute its functionality at a target resource, but also such a script may potentially perform other powerful actions that can result in security breaches (e.g., deleting accounts, creating new accounts, modifying system files; impersonating system administrators, etc.). Such scripts that are empowered by strong credentials can cause potentially critical damage to organizations.

In view of these inefficiencies and security vulnerabilities associated with scripts in computing environments; there are technological needs for enhanced control and visibility over such scripts. Advantageously, technological solutions should be able to precisely analyze the specific characteristics of scripts (e.g., their origin, destination, authentication status, code functionality, use of credentials, etc.). Further, solutions should disable endpoint computing resources in the environment from executing such scripts. Instead, execution of the scripts may be performed at a centralized execution resource, or at the endpoint resources but only after a security check has been completed. Solutions should also be able to visually display to users (e.g., administrators) the security risks associated with scripts, and allow users to determine whether the scripts should be executed—and if so, under what execution conditions. Advantageously, such solutions should also enable execution of scripts on a just-enough-administration (e.g., least-privilege) basis, on a just-in-time basis, and through other efficient and secure schemes.

SUMMARY

The disclosed embodiments describe non-transitory computer readable media, systems, and methods for centrally analyzing and managing scripts. For example, in an exemplary embodiment, there may be a non-transitory computer readable medium including instructions that, when executed by at least one processor; cause the at least one processor to perform operations for centrally analyzing and managing scripts. The operations may comprise identifying, at a centralized script execution resource in a network environment, a first script; wherein endpoint resources in the network environment are not permitted to execute the first script, and wherein the centralized script execution resource is configured to execute the first script on behalf of at least one of the endpoint resources; identifying, at the centralized script execution resource, a security risk indication for the first script; determining, at the centralized script execution resource, a security context for the first script, the security context being based on at least one of: an identity requesting execution of the first script, an authentication status of the identity, a source of the first script, or an action type of the first script; and performing, based on the security risk indication and the security context, at least one of: determining whether to execute the first script at the centralized script execution resource on behalf of the at least one of the endpoint resources, executing the first script at the centralized script execution resource on behalf of the at least one of the endpoint resources, or determining execution conditions for execution of the first script at the centralized script execution resource on behalf of the at least one of the endpoint resources.

According to a disclosed embodiment, the performing is implemented on a just-in-time basis with respect to execution of the first script.

According to a disclosed embodiment, the performing is implemented on a just-enough-administration basis with respect to execution of the first script.

According to a disclosed embodiment, the operations further comprise prompting an identity for authentication before execution of the first script is permitted.

According to a disclosed embodiment, the operations further comprise prompting an identity for out-of-band authorization before execution of the first script is permitted.

According to a disclosed embodiment, the operations further comprise fetching a credential for the first script.

According to a disclosed embodiment, the security context is determined based on analyzing API calls associated with the first script.

According to a disclosed embodiment, the operations further comprise identifying a network credentials vault for use in retrieving a credential for use by the first script.

According to a disclosed embodiment, the first script is received at the centralized script execution resource through at least one of: a file upload user interface, or a copy-and-paste user interface.

According to a disclosed embodiment, the first script is at least one of: an executable file or a code instance.

According to another disclosed embodiment, a method may be implemented for centrally analyzing and managing scripts. The method may comprise identifying, at a centralized script execution resource in a network environment, a first script; wherein endpoint resources in the network environment are not permitted to execute the first script, and wherein the centralized script execution resource is configured to execute the first script on behalf of at least one of the endpoint resources; identifying, at the centralized script execution resource, a security risk indication for the first script; determining, at the centralized script execution resource, a security context for the first script, the security context being based on at least one of: an identity requesting execution of the first script, an authentication status of the identity, a source of the first script, or an action type of the first script; and performing, based on the security risk indication and the security context, at least one of: determining whether to execute the first script at the centralized script execution resource on behalf of the at least one of the endpoint resources, executing the first script at the centralized script execution resource on behalf of the at least one of the endpoint resources, or determining execution conditions for execution of the first script at the centralized script execution resource on behalf of the at least one of the endpoint resources.

According to a disclosed embodiment, the method further comprises disabling the endpoint resources from executing the first script in the network environment.

According to a disclosed embodiment, the centralized script execution resource is exclusively configured to execute a defined class of scripts, including the first script, in the network environment.

According to a disclosed embodiment, the first script is a serverless code instance.

According to a disclosed embodiment, the security context is based on a static analysis of code of the first script.

According to a disclosed embodiment, the method further comprises generating a report displaying the security risk indication and the security context.

According to a disclosed embodiment, the report further includes a description of functionality associated with the first script.

According to a disclosed embodiment, the method further comprises determining whether at least one of the security risk indication or the security context exceeds a threshold level.

According to a disclosed embodiment, the method further comprises, conditional on the determining, accessing a credential for use by the first script.

According to a disclosed embodiment, the method further comprises, conditional on the determining, obtaining a credential from a vault for use on behalf of the first script.

Further embodiments described herein relate to generating visual representations of scripts based on centralized security assessments. For example, according to some embodiments there may be a non-transitory computer readable medium including instructions that, when executed by at least one processor, cause the at least one processor to perform operations for generating visual representations of scripts based on centralized security assessments. Operations may comprise identifying, at a centralized script execution resource in a network environment, a first script; wherein endpoint resources in the network environment are not permitted to execute the first script, and wherein the centralized script execution resource is configured to execute the first script on behalf of at least one of the endpoint resources; performing a multidimensional analysis for a particular action of the first script based on at least: a service identity of the particular action, an action type of the particular action, and a target resource associated with the particular action; and providing a visual representation of a context of the particular action based on the multidimensional analysis, the visual representation expressing the service identity, the action type, and the target resource.

According to a disclosed embodiment, the service identity is an identity of at least one of the endpoint resources on whose behalf the centralized script execution resource is configured to perform the particular action.

According to a disclosed embodiment, the action type is at least one of: read, write, modify, change permission, delete, stop, upload, or create.

According to a disclosed embodiment, the first script is at least one of: an executable file or a code instance.

According to a disclosed embodiment, the operations further comprise generating a security risk level for the first script, the security risk level being presented in the visual representation as at least one of: a numerical score, a percentage, a ranking, a category, a graphical element, or a color.

According to a disclosed embodiment, the visual representation is part of an interactive interface that expresses customized context data regarding the particular action of the first script, the customized context data indicating at least one of: a location in the first script of the particular action, or prior activity involving the particular action.

According to a disclosed embodiment, the interactive interface is configured to, upon a defined interaction by a user, display the customized context data.

According to a disclosed embodiment, the operations further comprise identifying, at the centralized script execution resource and according to the multidimensional analysis, an overall security risk indication for the first script.

According to a disclosed embodiment, the operations further comprise sending a report comprising the overall security risk indication to a security network resource.

According to a disclosed embodiment, the security network resource is configured to control execution of the first script in the network environment.

According to another disclosed embodiment, a method may be implemented for generating visual representations of scripts based on centralized security assessments. The method may comprise identifying, at a centralized script execution resource in a network environment, a first script; wherein endpoint resources in the network environment are not permitted to execute the first script, and wherein the centralized script execution resource is configured to execute the first script on behalf of at least one of the endpoint resources; performing a multidimensional analysis for a particular action of the first script based on at least: a service identity of the particular action, an action type of the particular action, and a target resource associated with the particular action; and providing a visual representation of a context of the particular action based on the multidimensional analysis, the visual representation expressing the service identity, the action type, and the target resource.

According to a disclosed embodiment, the method further comprises performing the evaluating for a plurality of actions of the first script.

According to a disclosed embodiment, the method further comprises performing the evaluating for a plurality of scripts.

According to a disclosed embodiment, the visual representation expresses service identities, action types, and target resources for the plurality of scripts.

According to a disclosed embodiment, the method further comprises grouping portions of the visual representation based on at least one of: the service identities, the action types, or the target resources for the plurality of scripts.

According to a disclosed embodiment, the method further comprises grouping portions of the visual representation based on security risk levels for the plurality of scripts.

According to a disclosed embodiment, the visual representation expresses an authentication status of the service identity.

According to a disclosed embodiment, the method further comprises performing, based on a security risk level for the particular action of the first script, at least one of: determining whether to execute the first script, executing the first script, or determining execution conditions for execution of the first script.

According to a disclosed embodiment, the method further comprises fetching a credential for the first script.

According to a disclosed embodiment, the credential is identified based on a least-privilege security policy.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 2-10 are exemplary illustrations of user interfaces for centrally analyzing and managing scripts in accordance with disclosed embodiments.

DETAILED DESCRIPTION

Figure 1:
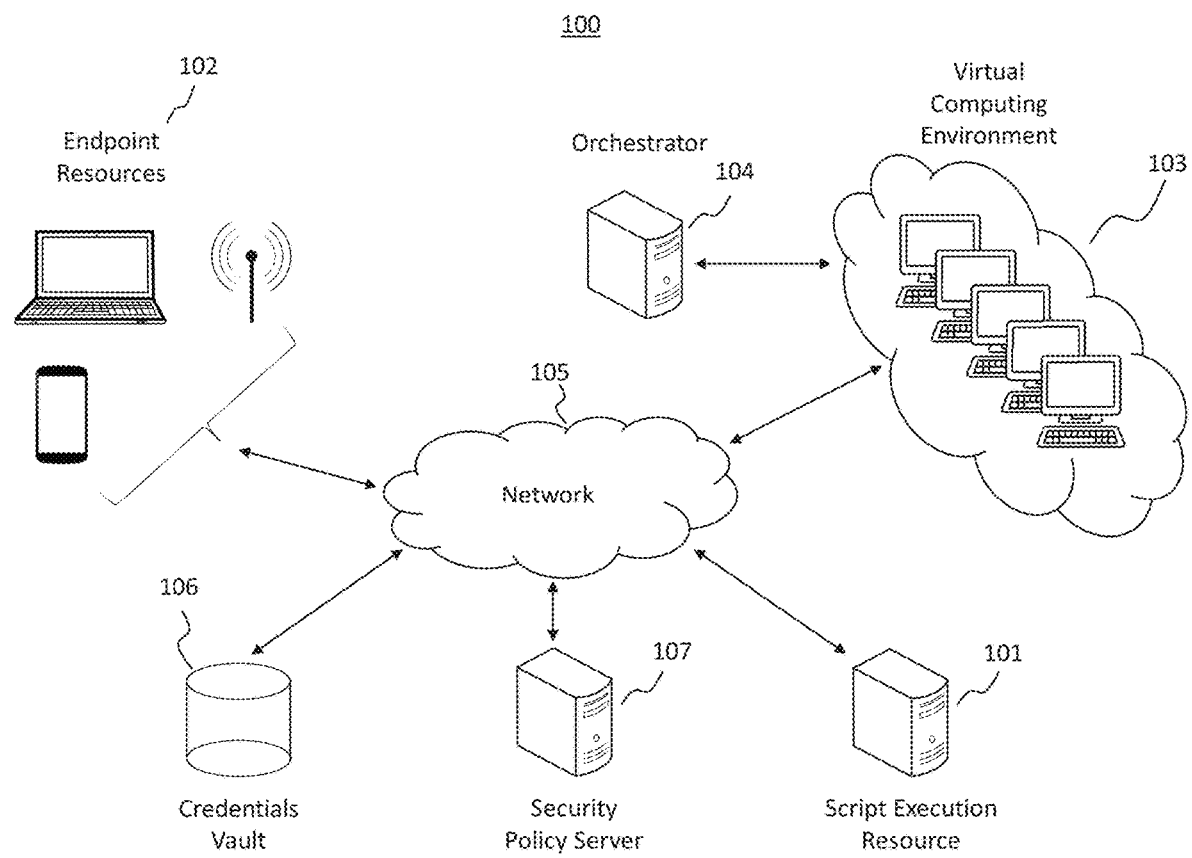
FIG. 1 is a block diagram of an exemplary system for centrally analyzing and managing scripts in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In accordance with disclosed techniques, scripts may be securely analyzed before they are allowed to be executed in a network environment. As discussed below, a central script execution resource may be configured to identify scripts, perform multifactor and fine-grained analyzes of their security attributes and programmed functionality, and provide assessments of the scripts. The assessments may indicate, for example, the origin of the scripts, their target destination, their code functionality, the authentication status of their source, the presence of embedded credentials, references to fetching external credentials, and other attributes. Based on this multifactor analysis of scripts, the script execution resource may generate a report allowing users to fully understand the security risks associated with the scripts, and determine whether the scripts should be executed. In the scripts are to be executed, they may be executed centrally at the script execution resource or in a distributed manner (e.g., through agents on endpoint computing resources).

These and the additional techniques discussed below overcome several technological security vulnerabilities and inefficiencies in prior systems. In prior systems, scripts have proliferated across many different computing resources in a largely unmonitored and untraceable manner. These scripts are often received for execution at network resources that are unfamiliar with them or their creators. Further, the network resources that receive scripts for execution are often unable to fully understand the security risks associated with the scripts. For example, the risks of the scripts containing embedded privileged credentials, being configured to fetch privileged credentials, being configured to perform malicious or dangerous actions, and other risks, are largely unknown to resources that receive and execute such scripts. The consequence is that scripts are often used to carry out network attacks, which may range from denial-of-service attacks, to information theft or misuse, to false impersonation of accounts or identities, to wrongful privilege escalation, to various other forms of security breaches. In addition, even if scripts are not purposefully configured to cause harm by attackers, some scripts are developed with inherent flaws that can lead to many of the same security vulnerabilities. These and related security and efficiency problems are addressed by the disclosed embodiments herein.

Reference will now be made in detail to the disclosed embodiments, examples of which are illustrated in the accompanying drawings.

FIG. 1 is a block diagram of an exemplary system 100 for centrally analyzing and managing scripts. In accordance with system 100, a script execution resource 101 may be configured to centrally identify scripts that are to be executed at endpoint machines (e.g., endpoint resources 102 or virtual computing instances 103). The script execution resource 101 may perform a detailed and multifactor analysis of a script, and based on that analysis may generate a report or visual depiction regarding the security attributes and functionality of the script. If the script is to be executed, it may be provisioned with credentials (e.g., from credentials vault 106) in accordance with a least-privilege policy (e.g., specified by security policy server 107), and on a just-on-time (MT) basis. The script may then be executed on a least-privilege (also called "just-enough-administration") basis and executed at the script execution resource 101 on behalf of the endpoint resource. In alternate embodiments, the script execution resource may be integrated with the endpoint resource itself (e.g., as an embedded software agent, a proxy server, etc.). These and other techniques are discussed in more detail below.

In accordance with disclosed embodiments, script execution resource 101 may be a computing resource configured to analyze scripts and determine whether they should be executed. Script execution resource 101 may be, for example, a physical server that is separate from endpoint resources 102 and virtual computing environment 103. Alternatively, script execution resource 101 may be a physical server in the same network environment as endpoint resources 102 or virtual computing environment 103. Further, in some embodiments script execution resource 101 may be a software-based server, a virtual computing instance (e.g., virtual machine, container instance, etc.), or other types of computing resources. Consistent with the disclosure below, script execution resource 101 may be configured to generate the user interfaces depicted in FIGS. 2-10, generate the visual security risk assessment of FIG. 11, and carry out the methods illustrated in FIGS. 12-13.

Endpoint resources 102 may include one or more of a wide variety of computing devices, such as desktop computers, laptops, tablets, smartphones, smart clothing, computer-embedded jewelry, computer-enabled applicants, various types of IoT devices, and other network-connected devices. In accordance with disclosed embodiments, endpoint resources 102 may have one or more hardware processor, memory, and network adapter. Such network adapters may enable the endpoint resources 102 to communicate across networks such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network (e.g., 4G, 5G, etc.), an enterprise or private data network, a storage area network, a virtual private network using a public network, a nearfield communications technique (e.g., Bluetooth™, infrared, etc.), or various other types of network communications. As described below, endpoint resources 102 may in some embodiments identify or upload scripts for analysis to script execution resource 101. Further, in additional embodiments endpoint resources 102 may be identified target destinations where scripts are to be executed.

Virtual computing environment 103 may include one or more of different types of virtual computing instances. For example, virtual computing environment 103 may include one or more virtual machines, container instances, or other types of virtualized instances, which may be based on virtualization tools provided by Amazon Web Services™ (AWS™), Microsoft Azure™, IBM Cloud™, Docker™, Google Cloud Platform™, Cisco Metapod™, Joyent™, vmWare™, or various others. As with endpoint resources 102, in some embodiments virtual computing environment 103 may have virtualized instances that are configured to identify or upload scripts for analysis by script execution resource 101. Further, in additional embodiments the virtual instances in virtual computing environment 103 may be the specified execution destinations of particular scripts.

In some embodiments, virtual computing environment 103 may be created or controlled by an orchestrator 104, which may be based on platforms such as AppFormix™ BMC Cloud LifeCycle Management™, IBM Cloud Orchestrator™, AWS CloudFormation™, Kubernetes™, or others. In other embodiments, virtual computing environment 103 may be a robotic automation platform for robotic process automation. The robotic automation platform may be based on tools such as Blue Prism™, UiPath™, Pega™, Verint™, or others. In additional embodiments, virtual computing environment 103 may be based on, or interface with, a continuous development or continuous deployment (e.g., DevOps) environment. For example, orchestrator 104 may run a DevOps or other automation tool (such as Jenkins™, Kubernetes™, Ansible™, Chef™, Puppet™, Bamboo™, VMware ESXi™, etc.) to continuously build, test, and deploy code or to perform other automation functions.

System 100 may also include one or more security policy servers 107 in communication with network 105. Security policy server 107 may perform authentication and/or authorization for various components of system 100, as discussed further below. Security policy server 107 may also manage security threats and access to restricted systems or locations. In some embodiments, security policy server 107 may be a cloud-based security or credential retrieval platform. For example, permissions and credentials may be retrieved by security policy server 107 using platforms such as CyberArk's Conjur™, CyberArk's Privileged Access Security™, Centrify's Privileged Access Service™, IBM's Security Privileged Identity Manager™, AWS's Identity and Access Management™, Azure's Active Directory Privileged Identity Management™, or various others.

According to below embodiments, security policy server 107 may also implement security policies, such as least-privilege and just-in-time authentication policies. Least-privilege policies may specify a minimum level (e.g., scope) or duration (e.g., time) of privileged access that particular identities may be accorded. As an example, if an identity needs to only have read-only privileges to a particular database between the hours of 1:00 am and 3:00 am, it would be insecure for the identity to be granted additional privileges (e.g., "write" or "modify" or "create"), or for other time periods (e.g., 4:00 pm). A least-privilege policy, as implemented by security policy server 107, may narrowly tailor the privileges accorded to the identity based on the actual activities that the identity needs to (legitimately) perform. Likewise, security policy server 107 may also enforce just-in-time (also called JIT) security techniques by allowing execution of scripts (e.g., at script execution resource 101) at the specific time execution is permitted and/or with the least-privilege credentials, as noted above. For example, according to JIT script execution, if the script needs to fetch a credential (e.g., from credentials vault 106) in order to perform its functionality, the credential may be fetched as part of the actual execution of the script, and not earlier or later. The credential, in other words, would be fetched for the script in real-time or on an on-demand basis. According to this JIT technique, the credential would not linger in the network during time when it is not needed for execution of the script, thus enhancing security.

According to system 100, credentials vault 106 may be a repository of credentials. Such credentials may be accessed by, or on behalf of, scripts that are executed at script execution resource 101. For example, in some embodiments credentials vault 106 may be a CyberArk™ vault (e.g., enterprise password vault), IBM Credential Vault™, Centrify™ credentials vault, or various other types of credentials management platforms. According to these techniques, credentials vault 106 may be configured to supply credentials on a one-time basis (e.g., and rotating or deleting the credentials after each use). Further, in some embodiments the credentials in vault 106 may require elevated forms of authentication to access (e.g., two-factor authentication, out-of-band authentication, administrator approval, etc.). According to the embodiments below, credentials fetched from vault 106 may be supplied directly to scripts that need them (e.g., scripts being executed in script execution resource 101) or indirectly on behalf of such scripts (e.g., to security policy server 107 or to script execution resource 101).

Script execution resource 101, endpoint resources 102, virtual computing environment 103, orchestrator 104, credentials vault 106, and security policy server 107 may communicate with each other as discussed below, and/or with other resources, over a network 105. Accordingly, network 105 may be composed of various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, infrared, etc.), or various other types of network communications. In some embodiments, network 105 may be a cloud network, (e.g., private cloud, public cloud, or hybrid cloud network), or a combination of these types of networks. In some embodiments, the communications may take place across two or more of these forms of networks and protocols.

FIG. 2 is an exemplary illustration of a user interface 200 for centrally analyzing and managing scripts, and for generating visual representations of scripts based on security assessments. Consistent with the disclosure below, interface 200 is similar to interfaces 300-1000, as discussed in connection with FIGS. 3-10, and each may be utilized for similar purposes of centrally analyzing and managing scripts, and for generating visual representations of scripts based on centralized security assessments. With reference to FIG. 1, these interfaces 200-1000 may be generated by, for example, script execution resource 101 or security policy server 107.

Interface 200 may be rendered through various different types of applications. For example, interface 200 may be rendered by an internet browser (e.g., Chrome™, Internet Explorer™, Firefox™, etc., according to a language such as HTML, Java™, Flash™, etc. Further, in some embodiments interface 200 may be rendered by a mobile operating system, such as Android™, iOS™, Windows Phone™, etc., or by an application running on a mobile device. As illustrated in FIG. 2, interface 200 may include an accounts interface 201, which displays information regarding system accounts (e.g., user accounts, application accounts, virtual instance identities, etc.). In the example shown, a user "s_doej" as identified in user window 203 may be interfacing with interface 201 to analyze or run scripts. In accordance with interface 200, a user may select the "run script" graphical element 202, in order to begin a process of identifying or uploading a script for analysis.

Figure 3:
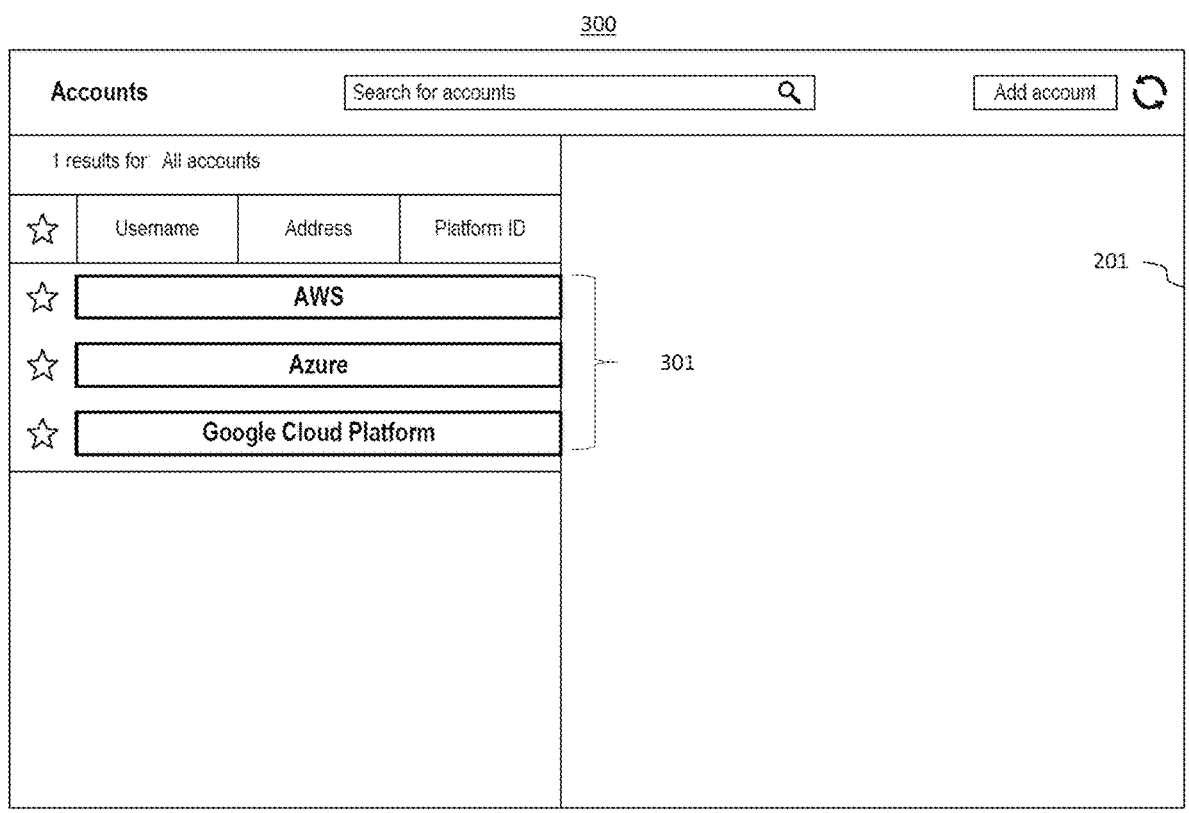

As shown in FIG. 3, interface 300 may be similar to interface 200, and may include an accounts interface 201. In interface 201, after a user has selected the "run script" graphical element 202 of FIG. 2, the user may then select among network environments 301 (e.g., AWS™, Azure™, Google Cloud Platform™, etc.) for purposes of identifying or uploading a script for analysis. In accordance with network environments 301, a user can select a particular environment (whether virtualized environment, or on-premises network) with respect to which a script will be analyzed. For example, by selecting "AWS™" among network environments 301; a particular script may be analyzed in terms of its security attributes as if it was being executed in an AWS™ environment. In some embodiments, this may include gathering data regarding a current or historical configuration of the AWS™ environment. For example, the configuration of a virtualized network may come from orchestrator 104, which may provide details such as the identities of virtualized instances, when they were spun up, how long they have been executing, their activity history, what their functions are, whether they have been authenticated, whether they contain embedded credentials, what target resources they are programmed to communicate with, and various other attributes. When a particular script is then analyzed by script execution resource 101, as discussed below, it may be analyzed based on these attributes regarding the selected AWS™ environment.

Figure 4:
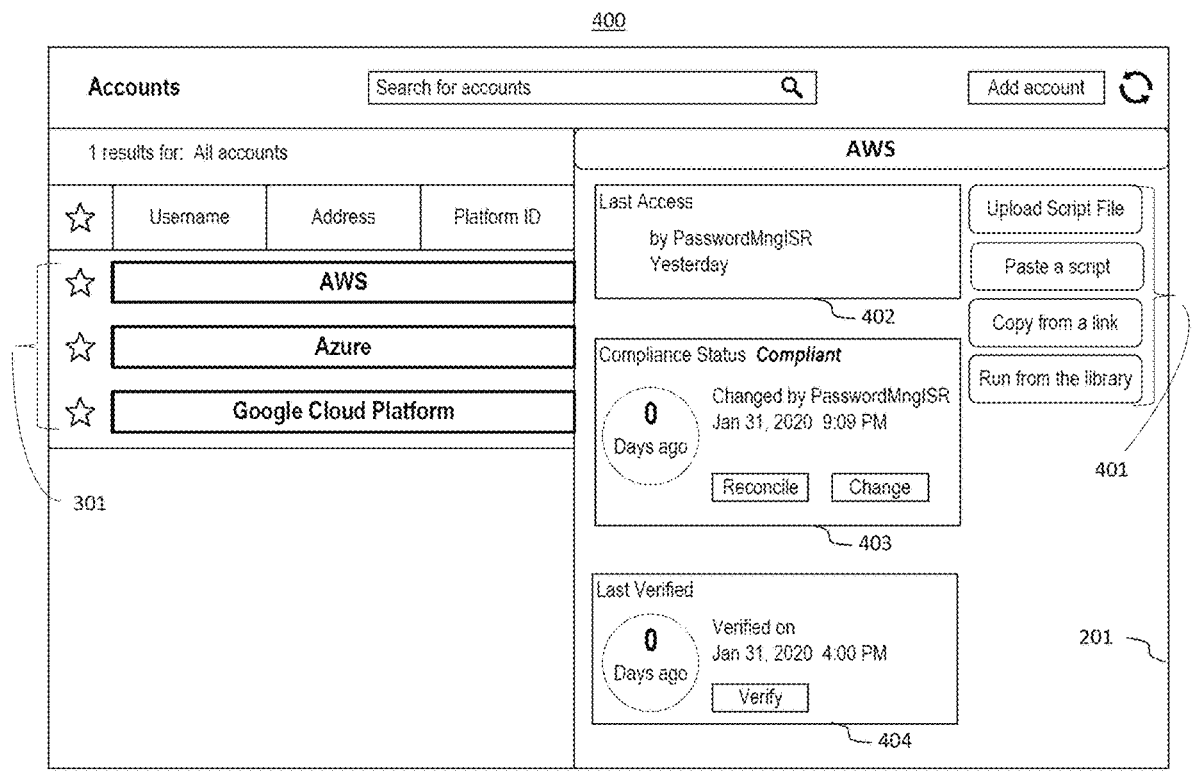

FIG. 4 illustrates an interface 400 for analyzing attributes of a script. Consistent with the above exemplary interfaces 200-300, interface 400 may include an accounts interface 201, and a selection of network environments 301. Further, as shown in interface 400, there may be a menu interface 401 allowing users to perform operations such as uploading script files for analysis at script execution resource 101, pasting in (e.g., through copy-and-paste) actual script contents for analysis at script execution resource 101, copying in script contents from a link (e.g., hyperlink, URL, URI, etc.) for analysis at script execution resource 101, or running a script from a stored library (e.g., stored at script execution resource 101) for analysis at analysis at script execution resource 101. Using these options within menu interface 401, as discussed further below, users may identify or upload scripts for analysis and potential execution at script execution resource 101.

Interface 400 also includes a last access interface 402, compliance status interface 403, and last verified interface 404. In accordance with various embodiments, the last access interface 402 may indicate the last date and/or time a particular identity (e.g. "PasswordMngISR") accessed the selected environment (e.g., AWS™ environment selected from network environments 301). In other embodiments, last access interface 402 may indicate various other historical attributes, such as the last time the identity uploaded or identified a script for analysis, the last time the identity was authenticated, the last time the identity made changes in the AWS™ environment, or other attributes. The compliance status interface 403 may indicate, in turn, a status as to whether the AWS™ environment is currently compliant with a security policy. For example, compliance status interface 403 may indicate whether the AWS™ environment and its constituent virtual instances comply with a least-privilege policy (e.g., maintained by security policy server 107). The compliance status interface 403 in this manner may indicate the last time of a compliance check with the least-privilege policy, may allow options for reconciling or auditing the specific results of the check, or changing the underlying least-privilege itself (e.g., changing a threshold least-privilege score or percentage for the environment, for specific identities, etc.). Further, the last verified interface 404 may indicate the last day and/or time that scripts in the AWS™ environment were processed by the script execution resource 101, as discussed further below. If a further verification is needed, a user may select the "verify" icon to perform another verification of the scripts in the AWS™ environment.

Figure 5:
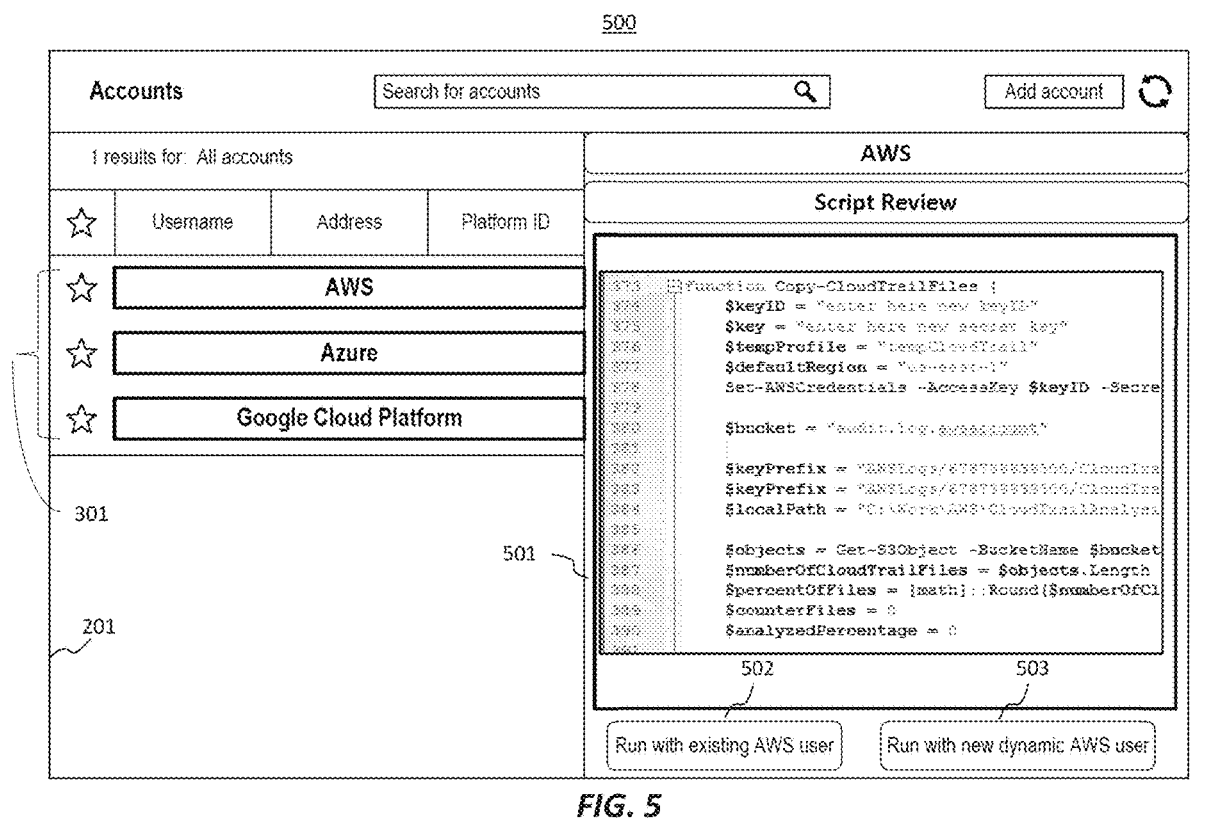

FIG. 5 illustrates an exemplary interface 500 that, similar to the above interfaces 200-400, includes an accounts interface 201. Further, as discussed above, interface 500 includes a network environments selection interface 301, which in this example has been selected in terms of the AWS™ network environment option. As shown in FIG. 5, interface 500 also includes a script review interface 501. Consistent with interface 500, script contents may be uploaded into script review interface 501 in various ways. For example, as discussed above in connection with FIG. 4, interface options 401 may enable a user to upload a script file, copy-and-paste in a script's contents, copy in the script from a link, or access a script from a library storage. Other techniques of importing scripts into interface 501 are possible as well. Further, while interface 501 illustrates the script as being visible to a user, in some embodiments the contents of the script may not be displayed to the user. If the contents of the script are displayed as illustrated, users may be provided options for interacting with the script's contents (e.g., editing, adding further script contents, etc.) or changing its attributes.

Interface 500 also includes option icons 502 and 503 which, respectively, may allow a user to analyze and/or execute a particular script using the existing configuration of an AWS™ identity or a newly created (e.g., dynamically created and configured) AWS™ identity. For example, identities in the AWS™ environment may have particular configurations such as identity names, addresses (e.g., IP address, MAC address, etc.), privileged account membership, access to privileged credentials, embedded privileged credentials, and various other configurations. Accordingly, when a particular script is analyzed and/or executed in terms of its security characteristics, as discussed below, it may be analyzed and/or executed using the configuration of an existing or dynamically created AWS™ identity using interface options 502 and 503. Further, in some embodiments when a script is uploaded for analysis and/or execution (e.g., using interface options 401 of FIG. 4), it may be uploaded together with an identification of a particular identity (or type of identity) that should execute it. If this information is provided, it may be used to perform the script evaluation, as discussed below. Of course, if Azure™ or Google Cloud Platform™ was selected instead of AWS™ from interface 301, interface options 502 and 503 would refer to existing identity configurations in those environments or dynamically created identity configurations in those embodiments.

Figure 6:
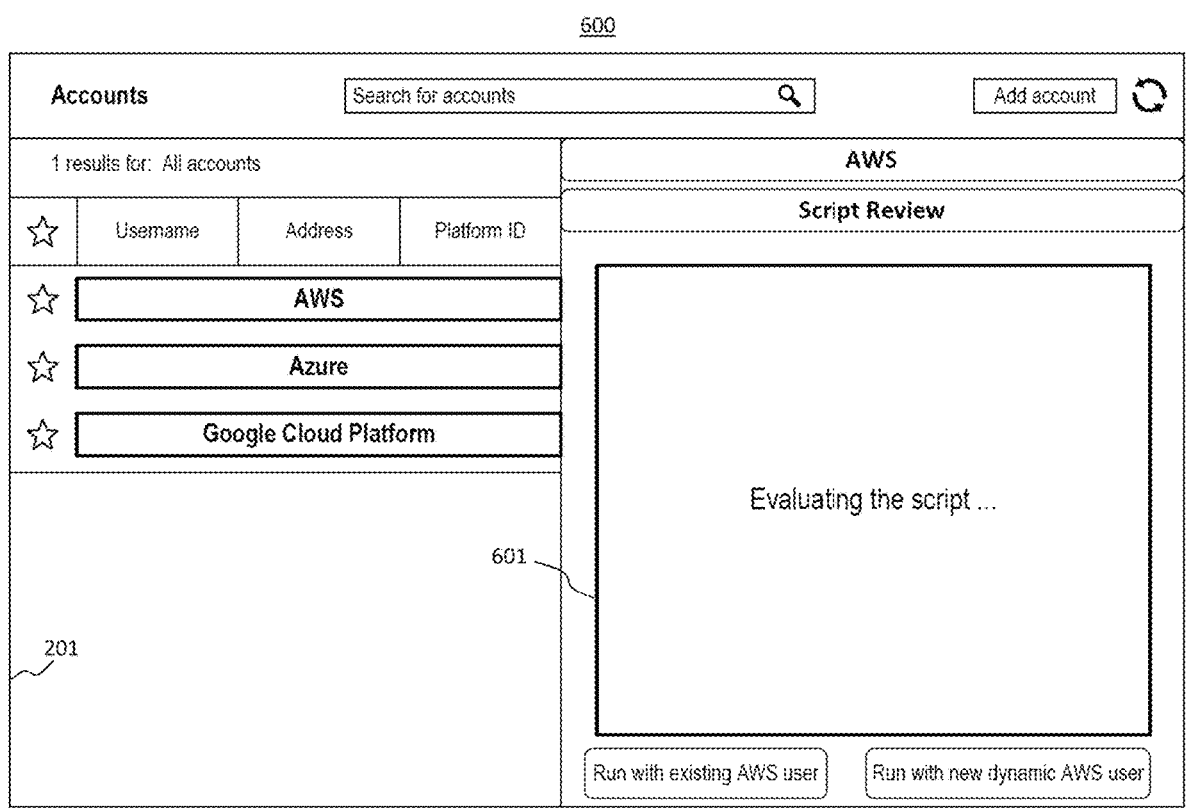

FIG. 6 illustrates an exemplary interface 600 for evaluating a script that has been uploaded or identified for analysis. As with the prior interfaces 200-500, interface 600 may include an accounts interface 201. Further, interface 600 may include a status interface 601 indicating the status of an evaluation of a script. For example, if the script is currently being evaluated and results of the evaluation are not yet complete or available, status interface 601 may include a message to that effect (e.g., "Evaluating the script . . . ").

Figure 7:
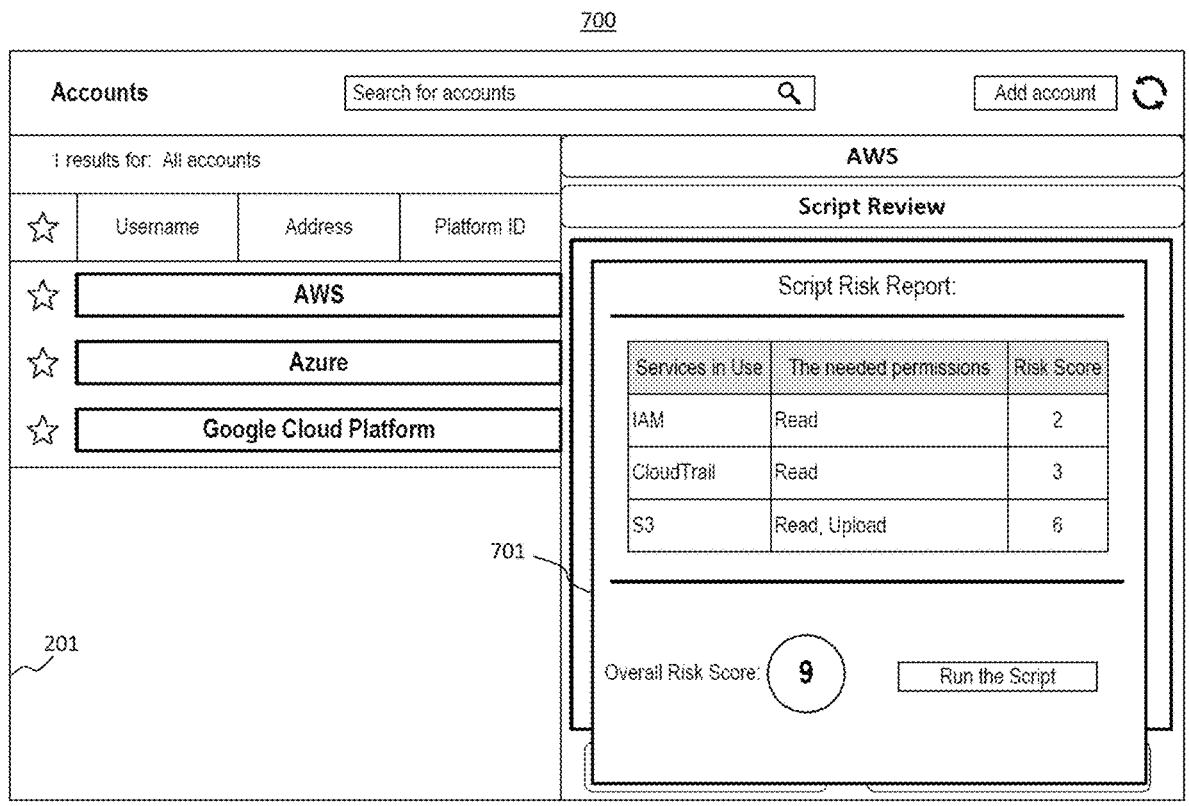

FIG. 7 depicts an exemplary interface 700 for displaying the results of an evaluation of a particular script. Consistent with interfaces 200-600 above, interface 700 may include an accounts interface 201. In addition, interface 700 illustrates a script risk report interface 701. This interface 701 includes the results of an assessment of the script that has been uploaded or otherwise identified. As illustrated, script risk report interface 701 may include details regarding the script's security profile, such as identifications of the services that it uses (e.g., in this example IAM™, CloudTrail™, S3™), the permissions it needs to execute (e.g., "read," "write," "modify," "create," "delete," etc.), and a risk score for each service and permission. The risk score may be computed in several ways. As an example, certain categories of permissions (e.g., "read") may be accorded relatively low risk scores, while other permissions (e.g., "create" or "delete") may be accorded higher risk scores. Further, a more fine-grained set of risk scores may be obtained by considering both the permission type and the service. As an example, a "read" permission may receive a relatively low risk score if the target resource is a generally accessible database in an organization (e.g., company directory), but a higher risk score if the database is highly sensitive (e.g., financial reporting, competitive intelligence, intellectual property, etc.). Similarly, a "create" permission may receive a relatively low score if the target application is relatively benign (e.g., a company messaging application) or a relatively high score if the application is sensitive (e.g., an IT application for creating new user accounts).

Based on the risk scores for each service and permission, a composite or overall risk score (e.g., "9") may be generated, as shown in interface 701. Further, interface 701 may include a selectable option to actually run the script. In some embodiments, this option may only appear, or may only be selectable, if the overall risk score is below a threshold risk level. For example, if the threshold level is "20" and the actual risk score of "9" is below the threshold, execution of the script may be permitted.

Figure 8:
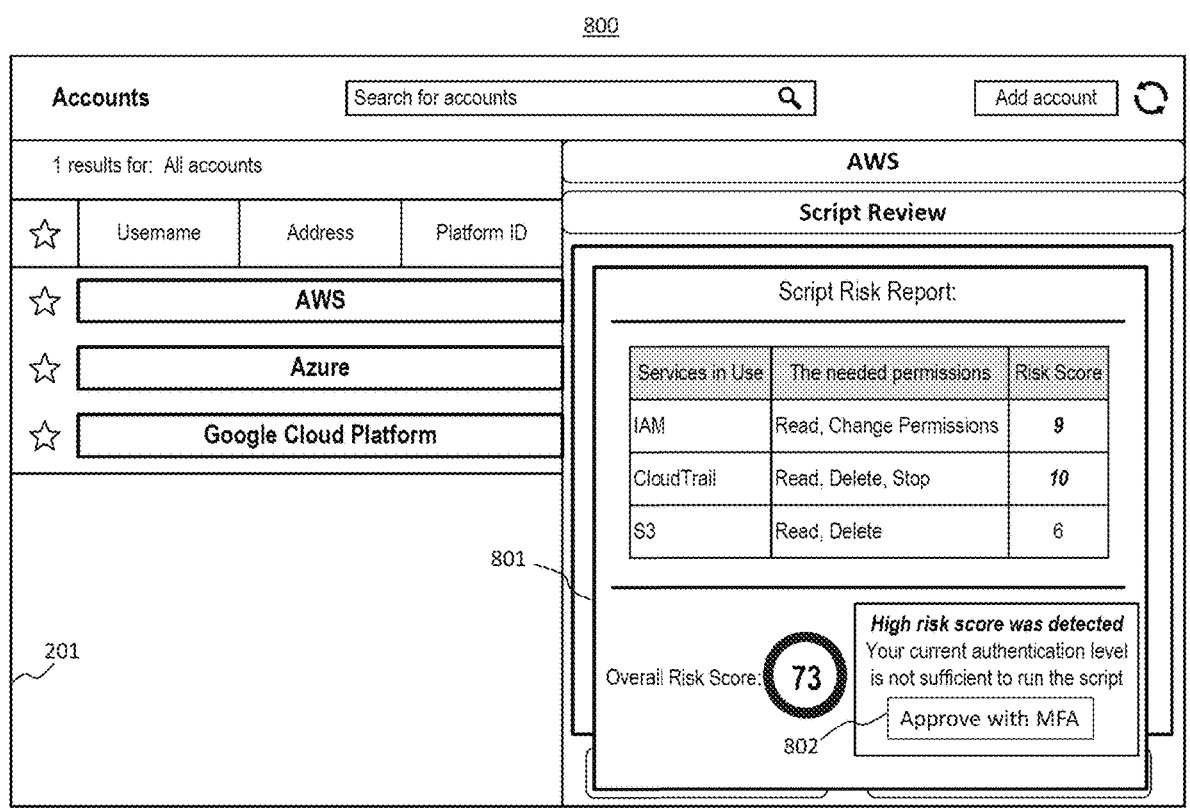

On the other hand, as illustrated in FIG. 8 and interface 800, if a script risk report interface 801 includes an overall risk score (e.g., "73") that is above the threshold level (e.g., "20"), execution of the script may not be enabled. In some embodiments, execution of the script may be blocked entirely. In other embodiments, as illustrated in FIG. 8, execution of the script may be possible but only after a successful multifactor authentication process (e.g., two-factor authentication, out-of-band authentication, administrator approval, etc.). For scripts that pose security risks due to their relatively high risk score, such multifactor authentication may be requested through selectable icon 802.

Figure 9:
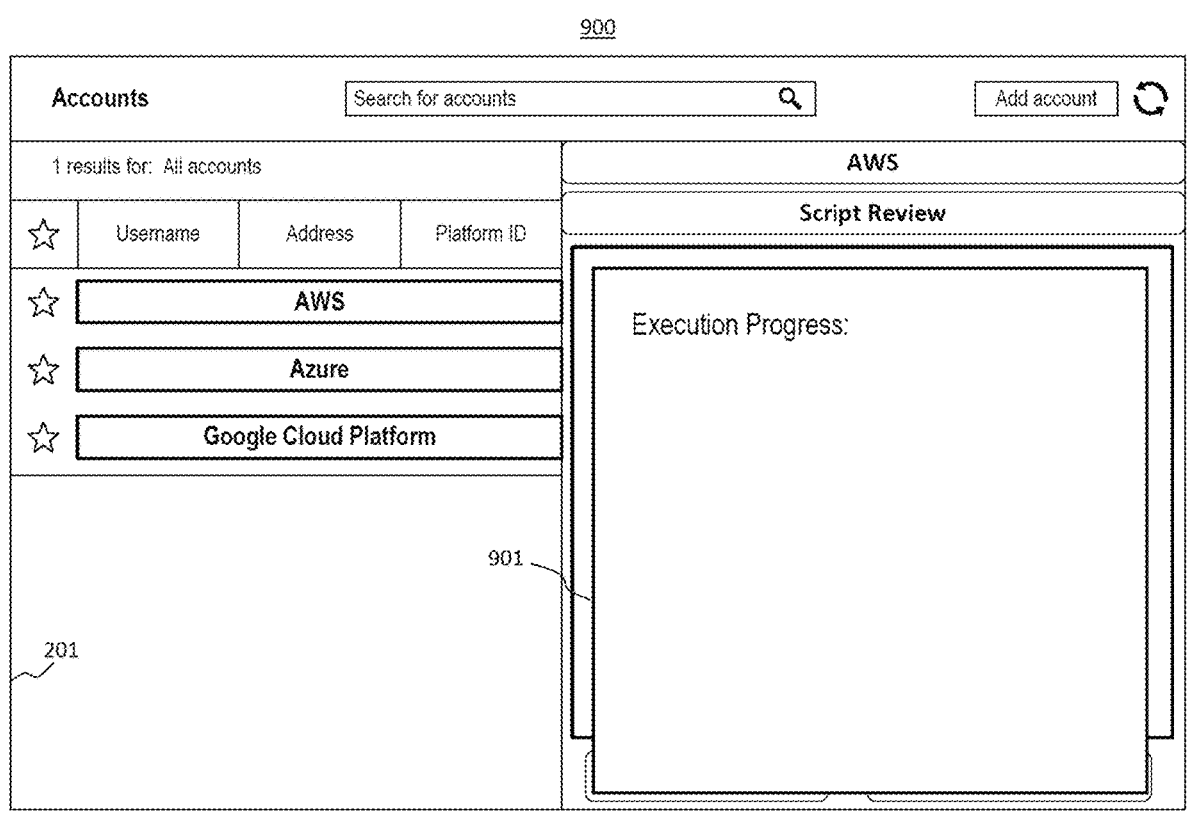

If execution of the script is permitted (e.g., with or without multifactor authentication), it may be executed as depicted in FIG. 9. Interface 900 of FIG. 9 includes accounts interface 201, as discussed above. Further, interface 900 includes an execution progress interface 901 illustrating a status of execution of the script. If execution of the script is currently in progress, a report to that effect may be illustrated (e.g., "Execution Progress"). Consistent with above embodiments, and as further discussed below, scripts may be executed securely at script execution resource 101, which may be located separate from or integrated with endpoint resources 102 or virtual computing resources 103.

Figure 10:
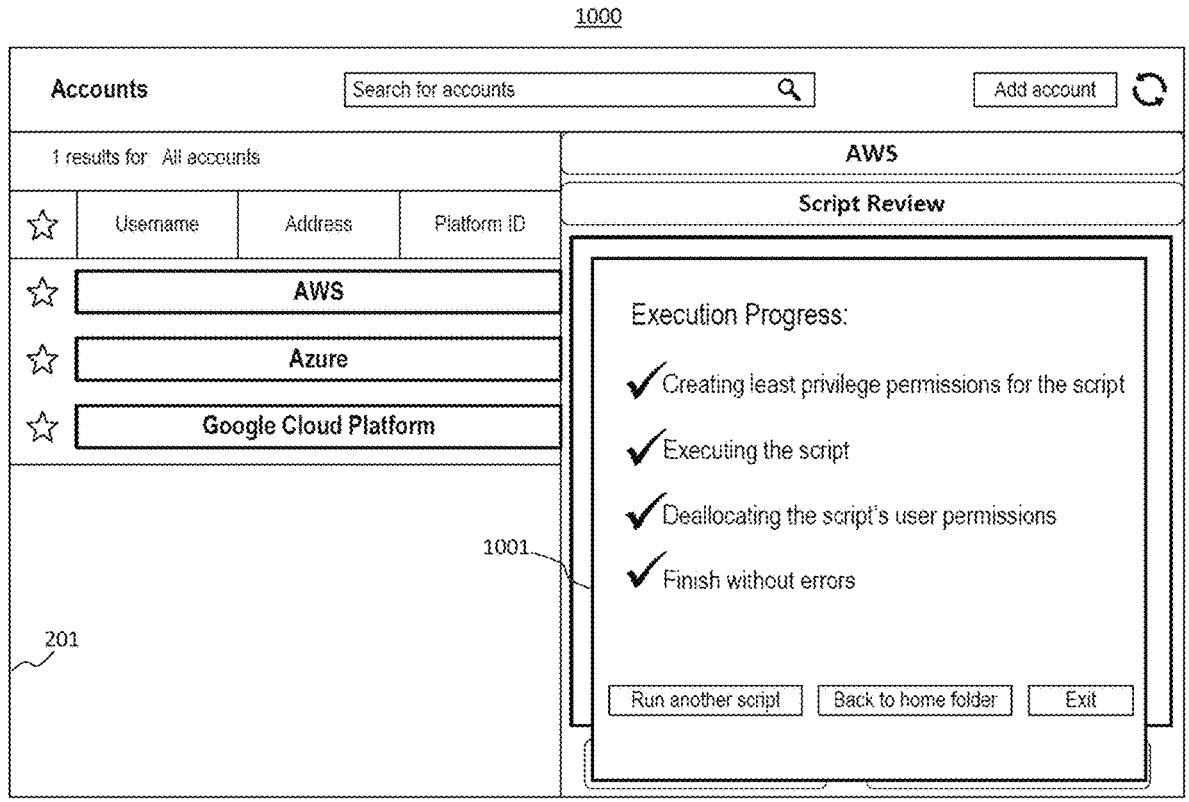

As the execution of the script occurs, additional details regarding the execution may be identified as shown in FIG. 10. According to interface 1000 of FIG. 10, execution progress interface 1001 may indicate whether least-privilege permissions have been created for the script (e.g., based on a least-privilege policy maintained by security policy server 107), whether the script has partially or fully executed, whether the script's user permissions have been deallocated, and whether the script's execution has successfully completed without errors (e.g., denials of access, unsuccessful connections, etc.). Execution progress interface 1001 may also include further selectable options, such as options of running another script, returning back to a home folder (e.g., the interface of FIG. 2), or exiting the underlying application.

Figure 11:
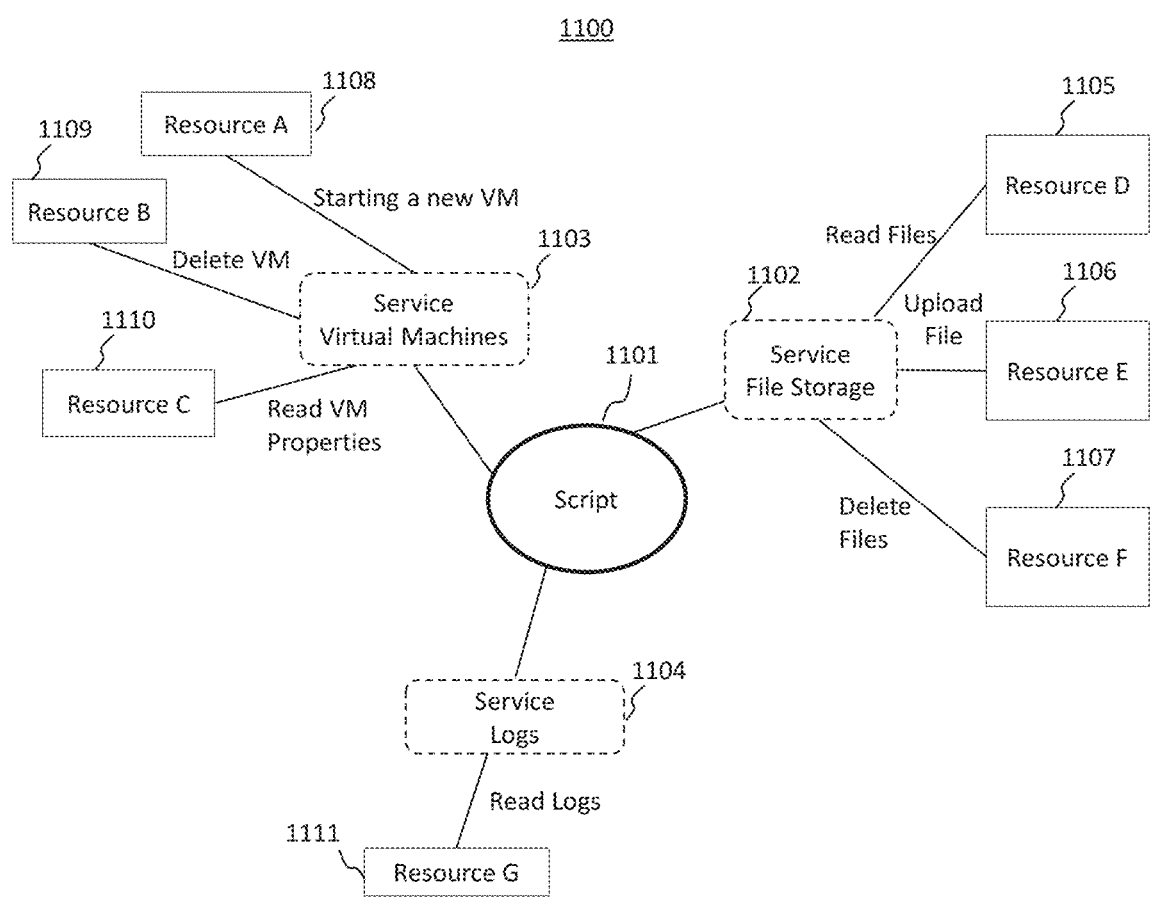
FIG. 11 is an exemplary illustration of a graphical view of a script and its security attributes in accordance with disclosed embodiments.

FIG. 11 illustrates an exemplary interface 1100 for visualizing a script and its security or functionality attributes. As illustrated, a particular script being analyzed may be depicted as script 1101. In some embodiments, the interface 1100 may display only the script 1101 and not the other visual elements 1102-1111. In such embodiments, when a user hovers their cursor (e.g., mouse, stylus, touch, etc.) over the icon of script 1101, or clicks script 1101, some (e.g., only icons 1102-1104) or all (e.g., icons 1102-1111) of the remaining icons may appear in interface 1100. This functionality may be implemented, for example, through an HTML "onmouseover" event, through JavaScript (e.g., as JavaScript itself or with an "addEventListener( )" technique), through cascading style sheets (CSS) ":hover" selector techniques, or through other techniques. As an example, if the user hovers or clicks on the script 1101 icon, that may cause icons 1102-1104 to appear in interface 1100. Then, when a user further hovers or clicks on one of these icons (e.g., service file storage 1102), that may cause its constituent icons (e.g., resource D 1105, resource E 1106, and resource F 1107) to appear in interface 1100. Alternatively, in some embodiments all of icons 1101-1111 may appear initially in interface 1100, even without hovering or clicking on script 1101 or other icons.

As discussed further below, the interface 1100 may depict the various network resources that a particular script interacts with, as well as the functionalities of the script with respect to those network resources. For example, in interface 1100 the script 1101 being analyzed may be configured to read security log files and make updates to two different systems based on those log files. In particular, in the illustrated example the script 1101 may be configured to access a service logs 1104 resource (e.g., network database), and may have "read" authorization with respect to that database. The script 1101 may be configured to query the service logs 1104 database for a particular file or data entry, such as resource G 1111.

In accordance with this example, the script 1101 may then access a service file storage 1102 resource. This may be, for example, a network security application that executes, at least in part, based on data from service logs resource 1104 (e.g., resource G 1111). The script 1101 as illustrated may have functionality that involves "read" permissions with respect to resource D 1105 (e.g., a security policy file), "upload" permissions with respect to resource E 1106 (e.g., a database), and "delete" permissions with respect to resource F 1107 (e.g., a ticketing or auditing system). Further, the script 1101 may also have functionality that involves service virtual machines 1103. For example, these virtual machines may be Docker™ container instances that are configured to monitor endpoint computing devices in a network. In the illustrated example, script 1101 may have functionality that involves "create" or "instantiate" permissions with respect to resource A 1108, "delete" permissions with respect to resource B 1109, and "read" permissions with respect to resource C 1110. For example, the script 1101 may be configured to spin up new container instances such as resource A 1108, delete existing container instances such as resource B 1109, and read container instance properties (e.g., from the instance itself or from orchestrator 104).

In some embodiments, the various icons 1101-1111 may be differentiated from each other by visual techniques, such as line thickness (e.g., bolding), use of dashes, colors, sizes (e.g., relative sizes), arrows, etc. Further, in some instances of interface 1100 icons may be visually depicted based on the type of permissions they involve. For example, if script 1101 involves "read" permissions at service logs 1104 to obtain resource G 1111, those icons may be represented using a particular color. On the other hand, a different color may be used to represent script 1101's functionality involving "create" or "instantiate" permissions at service virtual machines 1103 to spin up a new instance of resource A 1108. In this manner, interface 1100 may visually indicate to system administrators and other users the relative security risks posed by discrete functions performed by script 1101.

In further embodiments of interface 1100, the interface may also include specific sections of the script (e.g., the text of the script, from FIG. 5 and interface 501) that correspond to specific code functions. For example, code segments in the interface 1100 may be highlighted or emphasized when a user hovers or clicks on particular elements of interface 1100 (e.g., icons 1101-1111). In this manner, when a user selects a particular icon, the user may visually observe in interface 1100 the specific code segment that performs the functionality of the icon.

In additional embodiments, interface 1100 may visually represent multiple scripts. That is, rather than only depict script 1101, interface 1100 may visually display multiple such scripts. The scripts may be those that are being analyzed together (e.g., as part of a defined class, such as all scripts newly identified, all scripts destined for a particular endpoint for execution, all scripts involving a particular target resource, all scripts having embedded credentials, all scripts having code that will fetch a credential, etc.).

Figure 12:
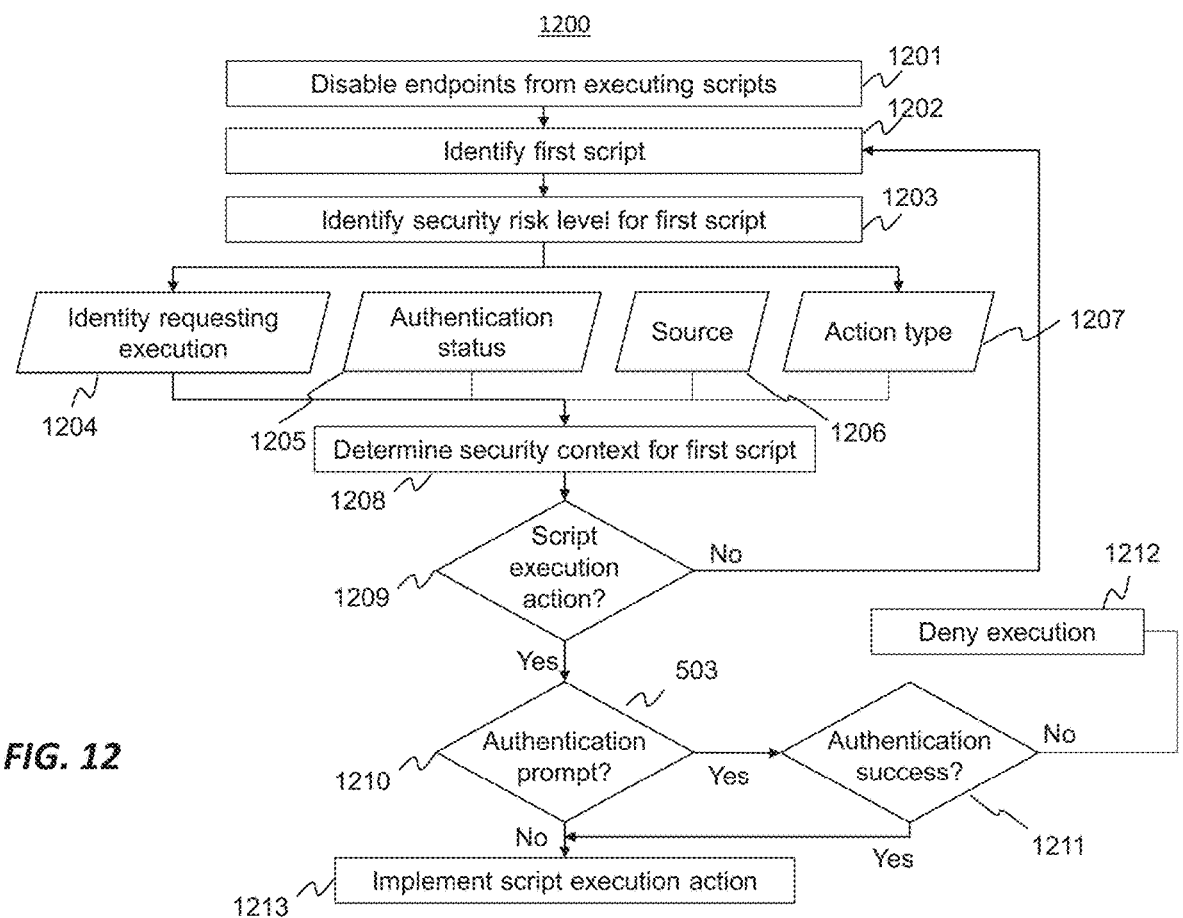
FIG. 12 is an exemplary flowchart depicting a process of centrally analyzing and managing scripts in accordance with disclosed embodiments.

FIG. 12 illustrates an exemplary flowchart of a process 1200 for centrally analyzing and managing scripts. Consistent with above embodiments, process 1200 may be carried out by script execution resource 101 of FIG. 1. Further, in some embodiments, script execution resource 101 may perform process 1200 in conjunction with security policy server 107, credentials vault 106, and/or orchestrator 104. As discussed above, script execution resource 101 may be located physically separate from endpoint resources 102 and virtual computing environment 103 (e.g., as a separate server or virtualized server instance), or integrated with endpoint resources 102 and virtual computing environment 103 (e.g., as a proxy server, or embedded agent).

According to process 1200, operation 1201 may including disabling endpoints from executing scripts. For example, this may include script execution resource 101 instructing endpoint resources 102 or virtual computing environment 103 not to execute externally originating scripts. In some embodiments, the instruction may be provided to orchestrator 104, which may then instruct virtual computing environment 103 not to execute such scripts. In particular use cases, the instruction may be that endpoints should not execute any scripts, while in other situations the instruction may prohibit endpoints from executing a particular defined class of scripts (e.g., those originating from a particular source, those lacking authentication, those requiring access to a credentials vault (e.g., vault 106), those not complying with a security policy (e.g., behavior-based or anomaly-detection policy), etc. In some embodiments, the instruction to the endpoint not to execute scripts may operate through an interception technique. For example, script execution resource 101 may be configured to monitor network traffic addressed to the endpoints, and intercept such traffic. This may occur through proxying techniques, DNS rerouting, or other techniques. Further, in embodiments where script execution resource 101 is embedded locally into endpoints, this may occur through similar techniques or through software hooking techniques (e.g., operating system hooks).

In operation 1202, process 1200 include identifying, at the centralized script execution resource 101, a first script. Consistent with the above discussion, the script may be identified in several ways. For example, the script may be intercepted by script execution resource 101 through the techniques noted above. Further, in some embodiments the script may be identified to script execution resource 101 by orchestrator 104 (e.g., based on orchestrator 104 detecting a new script in virtual computing environment 103). Further, in some embodiments the identification of the script may occur as part of a regular (e.g., periodic) scan of endpoint resource 102 or virtual computing environment 103 for scripts. Such scripts may initially be stored in a quarantined area, such as a sandboxed execution queue, for analysis by script execution resource 101 before they are executed.

Process 1200 may also include an operation 1203 of identifying, at the script execution resource 101, a security risk indication for the first script. In some embodiments, as discussed in connection with FIGS. 7-8, this may involve computing a risk score (e.g., numerical score, percentage, level, etc.) for the script. The score may be computed, in some embodiments, by considering the types of permissions involved in the script's functionality. For example, certain (lower) scores may be assigned to permissions such as "read" while other (higher) scores may be assigned to permissions such as "create," "modify," "delete," "move," etc. Further, as discussed above, in some embodiments the score may be based on both the permission itself (e.g., "read" or "create") and on attributes of the script's functionality. For example, if the script is configured to perform operations on a sensitive target resource (e.g., sensitive server or database), that may increase the risk score, while a script that performs operations on publicly accessible or generally accessible resources may receive a lower risk score.

In further embodiments, the risk score may be based on whether the script complies with a least-privilege security policy. For example, security policy server 107 may maintain security policies defining least-privilege security requirements. These requirements may specific a minimum level (e.g., scope, duration, etc.) of privileged access rights. For example, if a script has functionality involving accessing a secure database at 3:00 am ET, a least privilege-policy may specify that the script should be allowed to obtain a privileged access credential allowing such access, but not broader access (e.g., not access to other network servers or databases, and not at times other than 3:00 am ET). Using such least-privilege rules stored at security policy server 107, the risk score for the script may in some embodiments be based on whether the script is least-privileged or not. For example, if the script has unnecessarily high privileges (e.g., based on an embedded credential, or a credential that it will fetch), or privileges assigned for an unnecessarily long duration, that may result in increasing the risk score for the script. On the other hand, if the script has privileged access rights limited to just its programmed functionality, it may receive a lower risk score. In various embodiments, the score may be weighted to give prominence to certain factors, and may be expressed in a variety of ways (e.g., numerical scales, rankings, percentages, categories, levels, icons, colors, etc.).

According to process 1200, operation 1208 may involve determining, at the centralized script execution resource 101, a security context for the first script. This may be a multidimensional analysis of the script, addressing its functional attributes and security properties. For example, the analysis may include analyzing, in operation 1204, the identity (e.g., account, user, virtual machine instance, application, code instance) requesting execution of the script. This may also include analyzing API calls associated with the script, performing a static analysis of the script (e.g., using tools such as Apache Yetus™, Cigital™, CodeScene™, ConQAT™, IBM Security AppScan™, etc.). The identity requesting execution of the script may be identified, for example, based on an account name, unique identifier, IP address, MAC address, virtual computing environment identifier, etc. The multidimensional analysis in operation 1208 may also be based on a determination of the authentication status of the script in operation 1205. For example, this may include determining whether the script has a verifiable digital signature, has been identified through an authentication handshake process, or otherwise has been authenticated by script execution resource 101. In some embodiments, the authentication status may also indicate whether the identity requesting execution of the script has been authenticated. Further, the multidimensional context analysis of the script in operation 1208 may be based on an identification of a source of the script in operation 1206. For example, this may indicate a source from which the script was uploaded. This may be, for example, a particular website (e.g., GitHub™), URL, URI, network address, network identity, or other source information. In some embodiments, this source information may simply be a binary value of "internal" or "external," indicating whether the script originated from inside or outside of a particular network environment (e.g., enterprise network). In addition, the multidimensional context analysis of the script in operation 1208 may include determining an action type of the script in operation 1207. For example, this may include determining the specific permission types called for based on the script's functionality (e.g., "read," "write," "modify," "delete," "create," etc.), the specific network resources involved in the functionality (e.g., target resources, as discussed above in connection with FIG. 11), whether the script has embedded credentials, whether the script is written to attempt to fetch credentials from an external source (e.g., vault 106), or other actions associated with the script.

In accordance with above embodiments, the security risk level from operation 1203 and/or the security context from operation 1208 may be expressed in user interfaces, such as interfaces 700 and 800 of FIGS. 7-8, above. Further, in some embodiments the security risk level and/or security context may be visually depicted through graphs or diagrams, such as explained above in connection with FIG. 11, and further below in connection with FIG. 13.

Process 1200 may also include determining, in operation 1209, whether to perform a script execution action for the script. The script execution action may include, for example, a binary decision of whether to allow or deny execution of the script. In further embodiments, the script execution action may be more nuanced. For example, as discussed above in connection with FIGS. 7 and 8, if the security risk score is below a threshold level (e.g., "9" being below "20" in FIG. 7), execution of the script may be permitted. On the other hand, if the security risk score is above the threshold (e.g., "73" being above "20" in FIG. 8), that may result in either outright denial of execution of the script, or a requirement that the script undergo additional authentication before it may be executed. For example, as depicted in FIG. 8, multifactor authentication (MFA) may be required before the script can be executed. In additional embodiments, the script execution action for the script determined in operation 1209 may include determining where to execute the script. The script may be executed, for example, at the script execution resource 101 itself, on behalf of a particular endpoint resource. Further, the script may be provided directly to the endpoint itself for local execution. In some embodiments, this determination of where to execute the script may be based on the script's risk score and/or security context, as discussed above. For example, relatively risky scripts may be executed only at the script execution resource 101, while less risky scripts may be permitted to be forwarded directly to endpoint resources for execution there.

In process 1200, if a script execution action is to be performed, the process may continue to operation 1210. Alternatively, if there is no execution action to perform (e.g., because the script is denied execution due to a high risk score, because the script failed MFA, etc.), process 1200 may loop back to operation 1202 to identify additional scripts for analysis. In other embodiments, process 1200 may loop back to operation 1201 instead (e.g., to reset a process of disabling endpoints from script execution), or to operation 1203 (e.g., to re-analyze the first script).

In operation 1210, process 1200 may include determining whether authentication is needed before execution of the script is permitted. For example, as discussed above, this may involve a prompt for MFA (e.g., out-of-band authentication, two-factor authentication, biometric authentication, approval from an administrator, etc.). In some embodiments, all scripts may be required to undergo authentication in operation 1210 before they can be executed. In alternative embodiments, only scripts with a risk score above a threshold level, as discussed above, may be required to undergo authentication in operation 1210. If authentication is required in operation 1210, process 1200 may proceed to operation 1211 where a check is performed of whether the authentication was successful. If so, process 1200 proceeds to operation 1213. If the authentication fails, process 1200 may proceed to operation 1212 where execution of the script is denied. Alternatively, in some embodiments a certain number of authentication attempts may be permitted. For example, if operation 1211 fails then process 1200 may cycle back to operation 1211 a certain number of times (e.g., three times) before proceeding to operation 1212.

In operation 1213, implementation of the script execution action is performed. As discussed above, this may involve executing the script at the script execution resource on behalf of a particular endpoint resource (e.g., an endpoint resource 102 or virtual instance in environment 1030. Further, in some embodiments this may involve providing the script directly to such an endpoint resource for local execution at the endpoint. Additionally, in some embodiments operation 1213 may include determining execution conditions for the script. For example, this may include determining whether a credential needs to be fetched for the script (e.g., from vault 106), whether a secure tunnel (e.g., SSH tunnel) needs to be established for execution of the script, whether an identity associated with the script needs to be included in a privileged membership group), etc.

In some embodiments, operation 1213 may be performed on a just-in-time basis. For example, this may mean that if a credential is needed to be fetched from vault 106 for the script to use, the credential is fetched only in operation 1213 itself, and not earlier in process 1200. In other words, the credential may be fetched in real-time on an as-needed basis, just as the script is executing. Similarly, a just-in-time implementation of operation 1213 may include adding an identity of a particular endpoint resource (e.g., on whose behalf the script is executing) to a privileged membership group (e.g., Windows Active Directory™ group, AWS IAM™ group, Azure AD™ group, etc.) as part of operation 1213 itself, and not earlier in process 1200.

In further embodiments, operation 1213 may be performed on a just-enough-administration (also called least-privileged) basis. As discussed above, security policy server 107 may maintain least-privilege security policies. These policies may specify minimal levels of privileged access rights needed to perform certain network functions (e.g., minimal scopes or durations). Accordingly, in operation 1213 if a credential is to be provided to a script for execution, the credential may be provisioned according to the least-privilege policy. This may mean that the credential is minimally powerful to perform the functionality of the script itself, and not additionally strong enough to perform other network operations (e.g., perform operations on other network servers or databases). The credential may also be allocated for a minimal duration (e.g., one minute, one hour, etc., or on a one-time usage basis).

Figure 13:
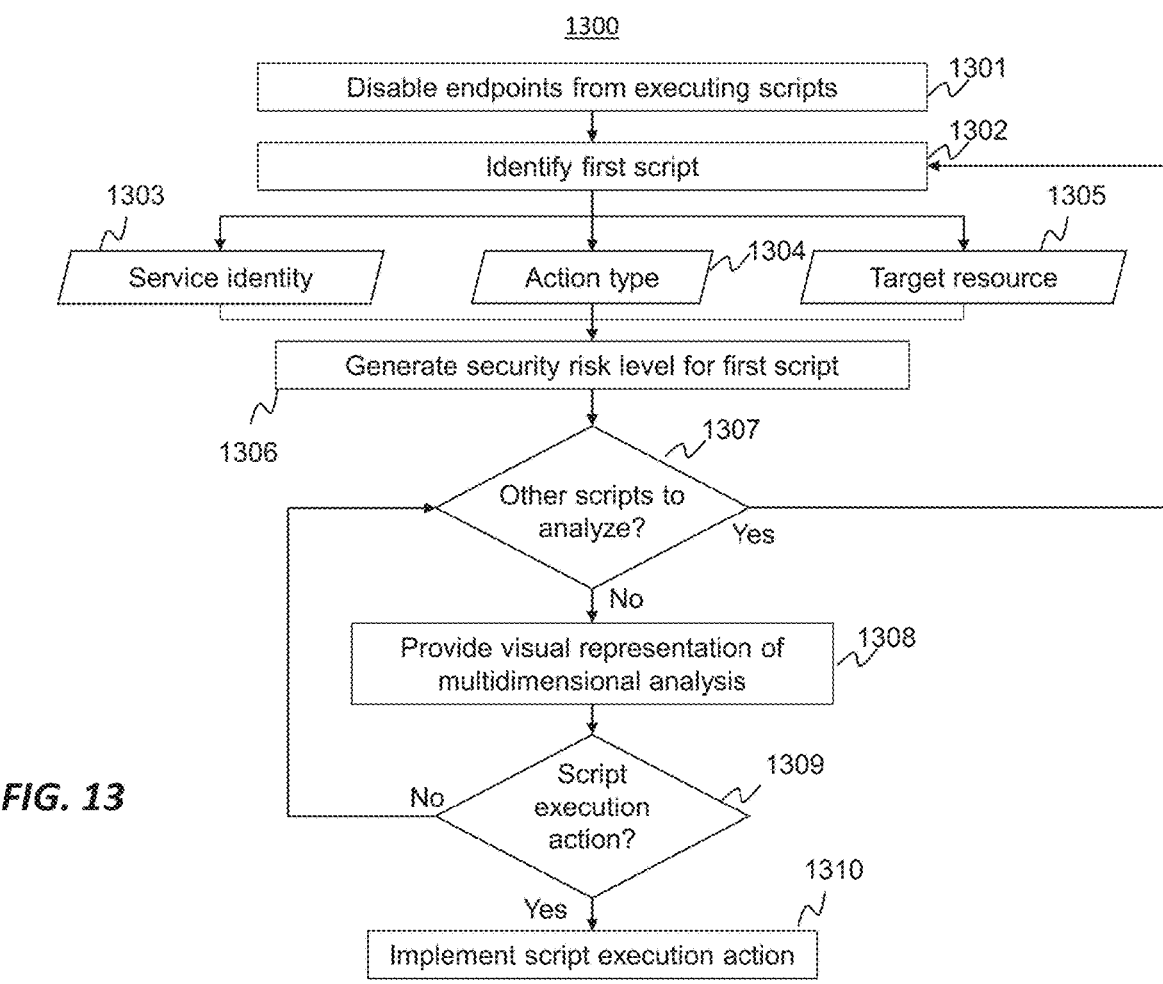
FIG. 13 is an exemplary flowchart depicting a process of generating visual representations of scripts based on centralized security assessments in accordance with disclosed embodiments.

FIG. 13 illustrates an exemplary flowchart of a process 1300 for generating visual representations of scripts based on centralized security assessments. Consistent with above embodiments, process 1300 may be carried out by script execution resource 101 of FIG. 1. Further, in some embodiments, script execution resource 101 may perform process 1300 in conjunction with security policy server 107, credentials vault 106, and/or orchestrator 104. As discussed above, script execution resource 101 may be located physically separate from endpoint resources 102 and virtual computing environment 103 (e.g., as a separate server or virtualized server instance), or integrated with endpoint resources 102 and virtual computing environment 103 (e.g., as a proxy server, or embedded agent).

In operation 1301, similar to operation 1201 discussed above in connection with FIG. 12, process 1300 may include disabling endpoints from executing scripts. This operation may take several different forms, as discussed above regarding FIG. 12. Similarly, operation 1302 of identifying a first script may take several forms, and may be similar to operation 1202 as discussed above in connection with FIG. 12. Further, operation 1306 of generating a security risk level for the script may be similar to operation 1203 of process 120, as discussed above. In particular, the security risk level may be based on a multidimensional analysis that considers a service identity (e.g., identity requesting execution, or identity on whose behalf execution of the script is to be performed) of the first script, an action type of the first script (e.g., "read" or "create"), and a target resource associated with the action (e.g., a resource on which the script will perform an operation). These multidimensional assessments may be based on operations 1303, 1304, and 1305, as discussed above and also illustrated in FIG. 13. Further, these operations may focus on a particular action (e.g., a particular software function) of the script. The result may be a security risk level presented in operation 1306 as a score, level, ranking, percentage, icon, category, color, etc.

In operation 1307, process 1300 may include determining whether there are other scripts to analyze. For example, according to process 1300 either one script or many scripts may be analyzed and visually depicted together. As an illustration, some embodiments may call for all scripts in a particular environment (e.g., corporate environment) to be analyzed together. Further, in some embodiments all scripts with embedded credentials, or that are configured to fetch credentials, may be analyzed together. If there are additional scripts to analyze, process 1300 may loop back to operation 1302 (or operation 1301) to analyze them as well. If there are no more scripts to analyze, process 1300 may continue to operation 1308.

In operation 1308, process 1300 may include providing a visual representation of a context of the particular action based on the multidimensional analysis. Consistent with the exemplary visual representation discussed in connection with FIG. 11, the visual representation may express the service identity (e.g., identity requesting execution of the script, or identity of an endpoint resource on whose behalf the script is to be executed), the action type (e.g., a particular command or permission), and the target resource (e.g., the resource on which commands are to be performed by the script). Consistent with the discussion regarding FIG. 11, the visual representation may indicate the connections between its components in a variety of ways. For example, risk levels of particular actions may be color-coded, where particularly sensitive actions may be displayed in one color, and relatively benign actions may be shown in another color. Further, different elements of the display may appear based on a user hovering over or clicking on them, as discussed above.

Process 1300 may also include determining whether to perform a script execution action. This may be an operation similar to operation 1209, as discussed above in connection with FIG. 12. In particular, if there is a script execution action to be performed, it may be performed in operation 1310, which is similar to operation 1213 as discussed in connection with process 1200. On the other hand, if there is no script execution action to perform, process 1300 may loop back to operation 1307 (or, e.g., to operation 1302) to potentially begin analyzing other scripts.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein; is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for centrally analyzing and managing scripts, the operations comprising:
    identifying, at a centralized script execution resource in a network environment, a first script;
    disabling endpoint resources in the network environment from executing the first script in the network environment;
    identifying, at the centralized script execution resource, a security risk indication for the first script, the security risk indication being based on permissions associated with a functionality of the first script;
    determining, at the centralized script execution resource, a security context for the first script, the security context being based on a multifactor analysis of the first script, the multifactor analysis being based on at least one of:
        an identity requesting execution of the first script,
        an authentication status of the identity,
        a source of the first script, or
        an action type of the first script;
    performing, based on the security risk indication and the security context, at least one of:
        determining whether to execute the first script at the centralized script execution resource on behalf of the at least one of the endpoint resources, or
        determining execution conditions for execution of the first script at the centralized script execution resource on behalf of the at least one of the endpoint resources; and
    executing the first script at the centralized script execution resource on behalf of the at least one of the endpoint resources.

2. The non-transitory computer readable medium of claim 1, wherein the performing is implemented on a just-in-time basis with respect to execution of the first script.

3. The non-transitory computer readable medium of claim 1, wherein the performing is implemented on a just-enough-administration basis with respect to execution of the first script.

4. The non-transitory computer readable medium of claim 1, wherein the operations further comprise prompting an identity for authentication before execution of the first script is permitted.

5. The non-transitory computer readable medium of claim 1, wherein the operations further comprise prompting the identity for out-of-band authorization before execution of the first script is permitted.

6. The non-transitory computer readable medium of claim 1, wherein the operations further comprise fetching a credential for the first script.

7. The non-transitory computer readable medium of claim 1, wherein the security context is determined based on analyzing API calls associated with the first script.

8. The non-transitory computer readable medium of claim 1, wherein the operations further comprise identifying a network credentials vault for use in retrieving a credential for use by the first script.

9. The non-transitory computer readable medium of claim 1, wherein the first script is received at the centralized script execution resource through at least one of: a file upload user interface, or a copy-and-paste user interface.

10. The non-transitory computer readable medium of claim 1, wherein the first script is at least one of: an executable file or a code instance.

11. A computer-implemented method for centrally analyzing and managing scripts, the method comprising:
    identifying, at a centralized script execution resource in a network environment, a first script;
    disabling endpoint resources in the network environment from executing the first script in the network environment;
    identifying, at the centralized script execution resource, a security risk indication for the first script, the security risk indication being based on permissions associated with a functionality of the first script;
    determining, at the centralized script execution resource, a security context for the first script, the security context being based on a multifactor analysis of the first script, the multifactor analysis being based on at least one of:
        an identity requesting execution of the first script,
        an authentication status of the identity,
        a source of the first script, or
        an action type of the first script;
    performing, based on the security risk indication and the security context, at least one of:
        determining whether to execute the first script at the centralized script execution resource on behalf of the at least one of the endpoint resources, or or determining execution conditions for execution of the first script at the centralized script execution resource on behalf of the at least one of the endpoint resources; and executing the first script at the centralized script execution resource on behalf of the at least one of the endpoint resources.

12. The computer-implemented method of claim 11, wherein the centralized script execution resource is exclusively configured to execute a defined class of scripts, including the first script, in the network environment.

13. The computer-implemented method of claim 11, wherein the first script is a serverless code instance.

14. The computer-implemented method of claim 11, wherein the security context is based on a static analysis of code of the first script.

15. The computer-implemented method of claim 11, further comprising generating a report displaying the security risk indication and the security context.

16. The computer-implemented method of claim 15, wherein the report further includes a description of functionality associated with the first script.

17. The computer-implemented method of claim 11, further comprising determining whether at least one of the security risk indication or the security context exceeds a threshold level.

18. The computer-implemented method of claim 17, further comprising, conditional on the determining, accessing a credential for use by the first script.

19. The computer-implemented method of claim 11, further comprising, conditional on the determining, obtaining a credential from a vault for use on behalf of the first script.

* * * * *